United States Patent [19]
Wilner

[11] Patent Number: 4,999,735
[45] Date of Patent: Mar. 12, 1991

[54] DIFFERENTIAL CAPACITIVE TRANSDUCER AND METHOD OF MAKING

[75] Inventor: L. Bruce Wilner, Palo Alto, Calif.

[73] Assignee: Allied-Signal Inc., Phoenix, Ariz.

[21] Appl. No.: 491,132

[22] Filed: Mar. 8, 1990

[51] Int. Cl.$^5$ ............................ H01G 7/00; G01L 1/22
[52] U.S. Cl. ...................................... 361/283; 73/718;
29/25.42
[58] Field of Search ................... 73/718, 724; 361/283;
29/25.42

[56] References Cited

U.S. PATENT DOCUMENTS

| | | | |
|---|---|---|---|
| 4,606,228 | 8/1986 | Whitmore | 73/718 |
| 4,825,335 | 8/1989 | Wilner | 361/283 |
| 4,905,575 | 3/1990 | Knecht et al. | 73/718 X |

*Primary Examiner*—Donald A. Griffin
*Attorney, Agent, or Firm*—Robert A. Walsh; James W. McFarland

[57] ABSTRACT

A differential variable capacitance acceleration sensor includes a sandwich structure having three stacked plates of silicon with the center plate mounted such that its center portion is enables to move in a sealed cavity with each side thereof moving toward and away from a fixed cooperating plate forming the opposite side of a capacitive circuit. The center portion or mass of the center plate is suspended from its rim by means of a large number of integral fingers extending from the rim to the top and bottom surfaces of the center portion. This center mass includes a number of through holes to permit the passage of air from one side to the other and may also include grooves to aid in the flow of air. The fixed top plate or lid and the base also have, or may have, grooves to assist in the passage of air. The integral fingers are formed in sinuous curves or other form varying from straightness but having a significant tension such that when the center mass is displaced during a sensed acceleration, the fingers tend toward straightness. In an alternative embodiment, the fingers are bars having corrugations stepped between different planes.

20 Claims, 9 Drawing Sheets

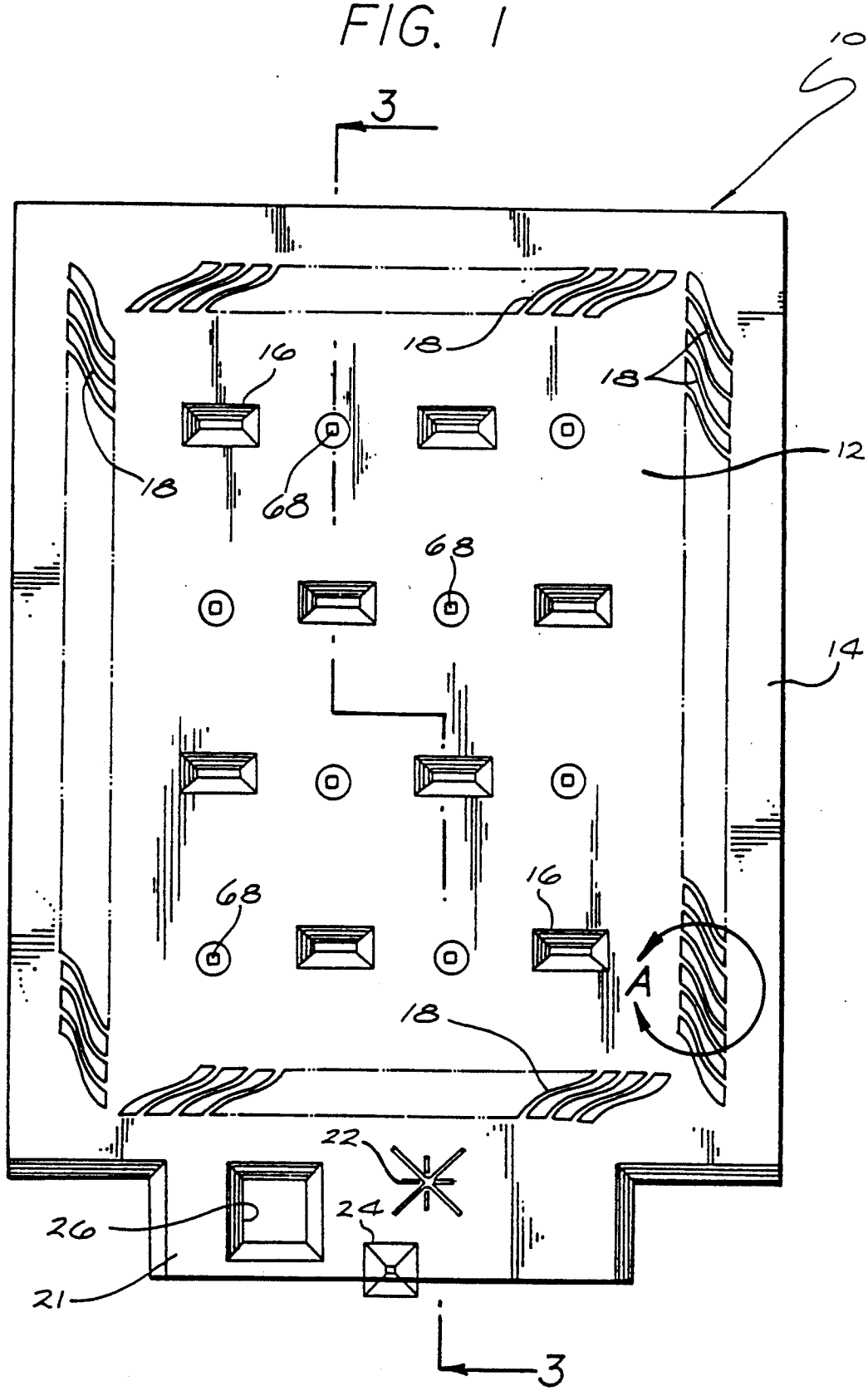

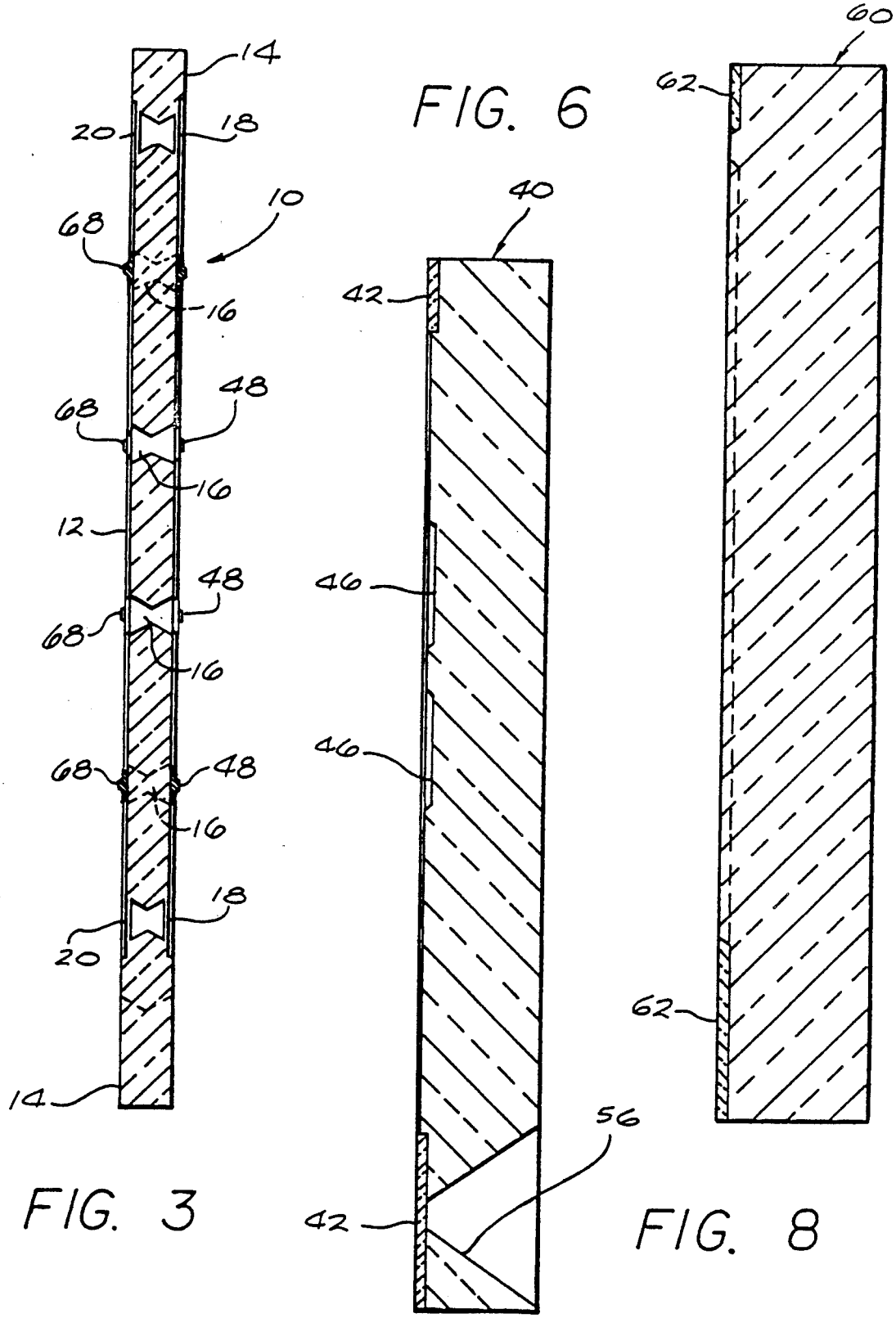

DIFFERENTIAL CAPACITIVE TRANSDUCER AND METHOD OF MAKING

This invention relates to a capacitive transducer and particularly to a differential capacitive acceleration transducer or sensor which utilizes a layered sandwich-type structure wherein a movable plate in a central layer is mounted to move in piston-like fashion in a cavity toward and away from a pair of outer layers consisting of fixed plates to provide an exceptionally large area of movement of the movable plate and wherein the movable plate is suspended in a differential manner from supports in two separate planes.

A capacitive transducer of the general type here under consideration is described in U.S. Pat. No. 4,825,335. As described in that patent the movable plate is suspended from a rim on two sets of suspending members or fingers extending from the opposite surfaces of the movable plate. The movable plate utilizes a plurality of spaced holes or passages for movement of fluid therethrough. The fluid (air) moves through the passages as the plate moves back and forth. Grooves on the surfaces of the plate direct the flow of fluid toward and away from the passages. Also taught is the use of spots of glass as stops over the movable plate. In the event of an overload the stops prevent electrical shorting of the plates. The spots, in addition, prevent two forms of latch-up in an overload. In very sensitive capacitive sensors, the attractive force of the electrical bias or carrier will exceed the spring force of the membrane mounting the movable piston at some proximity in the movement of the piston-like plate toward the fixed plate. Therefore, the plates latch together.

Another latch-up problem can take the form of pneumatic latch-up. That is, as flat plates are brought into very close proximity with each other, the flow resistance into the space between them becomes very high. It may take a long time (several seconds) for gas to reenter this space in a sensitive capacitive sensor, and allow the moving plate to return to its normal position after an overload. The stop spots spaced over the surface of the plate keep the space open between the two plates to allow gas flow and rapid recovery.

An additional feature taught in the above patent is the use of small silicon knobs, ridges, bars or other protuberances on the core which are jammed into an aluminum film on an opposing part of the sandwich, which has the effect that the knobs are held in contact by elastic deformation of the underlying material which makes for a stable connection between the parts. Finally, in the processing of the capacitor plate of the invention, highly sensitive capacitive sensors of very small size are produced, in accordance herewith, with uniform thin flexures by means of a diffused etch step.

In considering generally the conditions for producing a silicon capacitive sensor in accordance with the present invention, it is important to realize that the resulting instrument must probed a capacitor gap which is controlled within ±10% and the residual membrane thickness must be controllable within ±8%. The neutral axis of the membrane or membranes must be near the midplane of the wafer. In addition, the throughholes and channels below the suspending spring elements must not have fragile overhanging material. The stop spots must be insulated to withstand anodic bonding voltages, and be within 0.6 and 1.0 microns in thickness for a device with a capacitor gap of 2 to 4 microns. Finally, the bonding rims must be flat and smooth for anodic bonding, and no photolithography is allowed after the membranes are revealed or developed.

The fixed plates may be principally silicon, with inlays of Pyrex or equivalent borosilicate glass to provide insulating, low capacitance bonds between layers. One procedure for making such composites of Pyrex and silicon is to etch into the silicon recesses slightly deeper than the desired thickness of Pyrex inlay. Pyrex frit is then deposited on the silicon by sedimentation, then fused to form a solid layer of glass with a thickness greater than the depth recesses.

The surface of the wafer is then ground and polished to remove the Pyrex from the undisturbed surface of the silicon to produce a flat, smooth surface on the Pyrex in the recesses. The base, which is the fixed plate of the capacitor, is coated with a thin aluminum film, which is patterned photolithographically to provide convenient connections to the fixed plates and the central layer with the movable plate.

The Applicant has determined that some significant advantages will result from providing a variable capacitive acceleration sensor in which the three insulated layers are incorporated into a differential capacitive device with two measured capacitor gaps, one increasing, one decreasing, in response to a given input. In the differential arrangement the movable mass is suspended from both top and bottom edges on leaf springs which are atomically continuous with the mass. In the course of manufacturing the device, portions of the surface layers are given a heavy doping of boron at the locations of the suspending members. This doping tends to be uneven through the thickness of the spring, creating a spring bias, which is apparent as a curl if the spring is freed. An advantage of the differential arrangement is that the spring bias tends to be equalized or cancelled since the suspension is made up of two patterns of springs, one near each surface of the wafer, which patterns are as nearly identical as possible. The process for producing a differential capacitive acceleration sensor is more fully described in my U.S. Pat. No. 4,825,335 referred to above and which is incorporated herein by reference.

For some applications it has been found that the sensitivity of the accelerometer is less than desired and that this is attributable to stiffness of the lead springs or fingers. This stiffness is attributable to two separate factors: 1) the mechanical bending stress inherent in bending the fingers out of their at rest position, and 2) the strain introduced into the silicon wafer and hence, the fingers, through the heavy doping of boron. Applicant has found that by modifying the shape of the suspending members such that they are other than straight beams, such as by forming them as sinuous curved members, the tension is relieved by pulling the suspension members toward straightness. This construction has been shown to achieve a 10:1 relief of stress. It will be appreciated that a substantial reduction in stress results in a reduction in stiffness and, hence, considerable increase in sensitivity of the accelerometer which is formed with the described suspension members.

In the drawings:

FIG. 1 is a plan view of one side of the movable capacitor plate of the invention which forms the central portion of the sandwich structure;

FIG. 3 is a cross sectional view taken along line 3—3 of FIG. 1;

FIG. 6 is a cross sectional view taken along line 6—6 of FIG. 4;

FIG. 8 is a cross sectional view taken along line 8—8 of FIG. 7;

Figure 2:
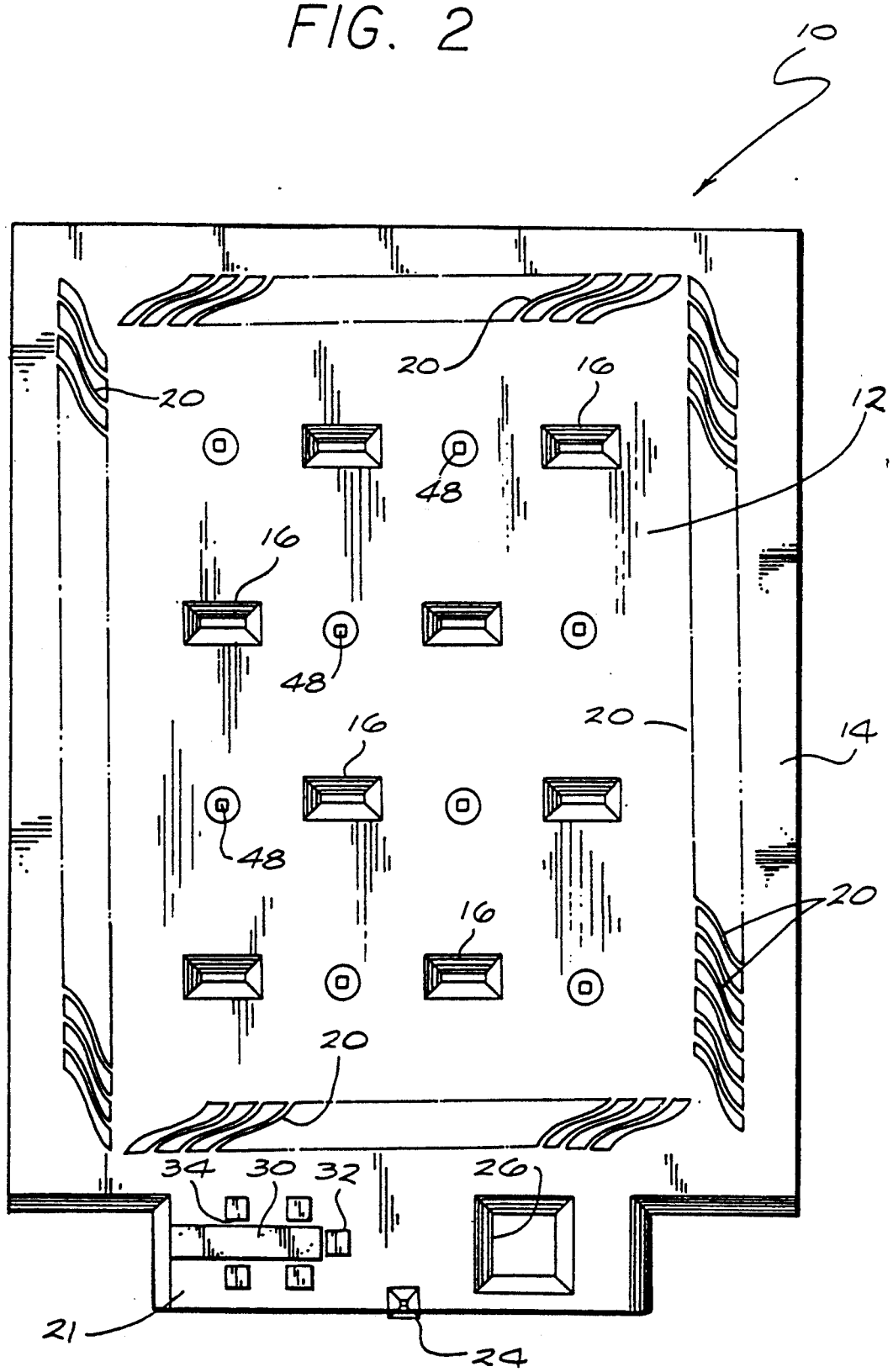
FIG. 2 is a plan view of the opposite side of the plate of FIG. 1.
Figure 1A:
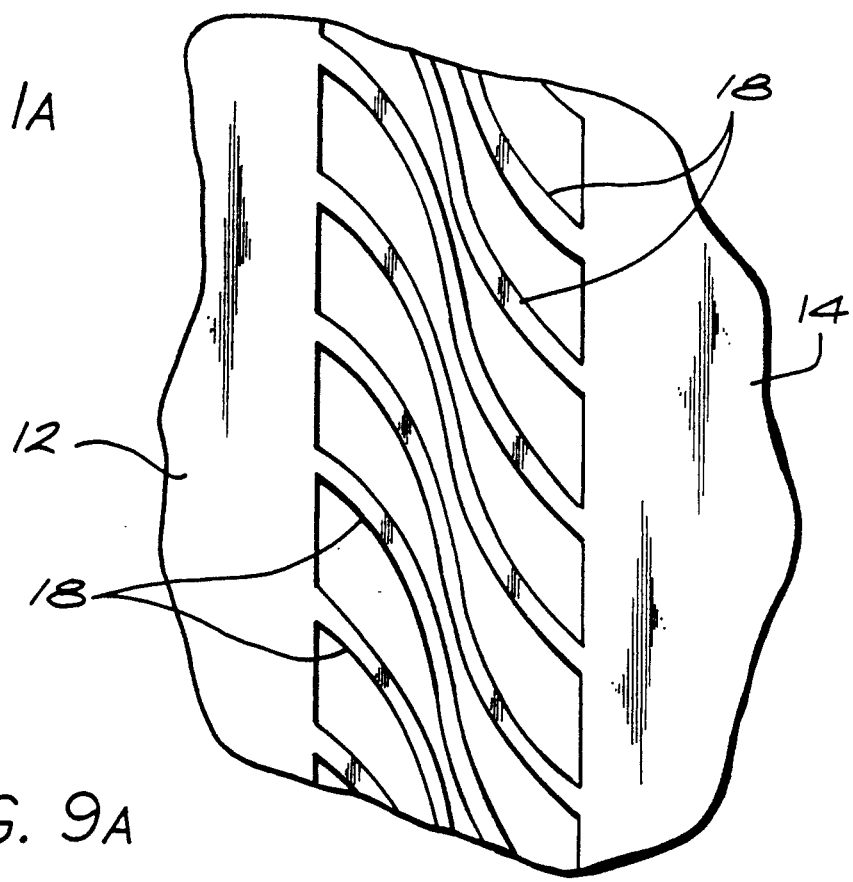
FIG. 1A is an enlarged portion of FIG. 1 identified A—A.

Referring to the drawings in which like reference characters refer to like parts throughout the several views thereof, FIG. 1 shows a plan view of the upper side of the movable central capacitor plate or core of the invention which plate is placed between the upper and lower fixed plates to form a sandwich structure for use as an ultrasensitive capacitive transducer. FIG. 2, is a plan view of the bottom side of the same central capacitor plate. FIG. 3 is a sectional view taken through plate 10 along line 3—3 of FIG. 1. Capacitor plate 10 includes a central movable plate portion or mass 12 movable in piston-like manner normal to the plane of the paper on which FIG. 1 is shown. The central mass 12 also includes a number of throughholes 16 which permit the passage of air across plate and a plurality of stop spots 48 which may be Pyrex inlays and which project above the surface of mass 12 to prevent latch-up, as described. FIG. 2 shows similar stop spots 68 which prevent mass 12 from latching up against its opposing surface. The central movable plate portion 12 is attached to a rim portion 14 by means of a large number of spaced sinuous suspension members 18 extending from rim 14 all around the periphery of the central section 12 suspension members 18 being shown in larger scale in FIG. 1A. Viewed from the bottom side in FIG. 2, another large group of such suspension members 20 extend from rim 14 to the bottom edge of central portion 12. In the sectional drawing, FIG. 3, it will be observed that the central portion 12 is, in effect, suspended from edge portion 14 by means of the curved suspension members 18 and 20. Also visible in this view are a number of the throughholes 16 and some of the stop spots 48 and 68. These throughholes are passages 16 which are spaced over the surface of the movable plate 12 allow the movement of air in the sandwich structure of the capacitive transducer from the bottom surface of plate 12 to the top surface thereof and vice versa.

The curved suspension members 18 and 20 are spaced across the opening between the central mass 12 and the rim 14. These fingers must be spaced and separated sufficiently to insure undercutting by the etch.

As can be seen in FIGS. 1, 1A and 2, the fingers or suspension members are or may be somewhat thicker near the mass 12 and the rim 14 and taper toward their centers.

Member 10 is initially formed somewhat larger than shown in FIG. 1 and includes an extended portion 21 having a star-shaped centering target 22 which is used in the course of assembly as well as a tapered hole 24 which is also used for aligning the layers of the sandwich construction. The item 26 shown in FIGS. 1 and 2 is a hole representing removal of excess material.

On the bottom side of member 10 (FIG. 2) the extension portion 21 shows a series of spaced squares and rectangles 30, 32 which are holes or depressions which extend below the surface of the rim 14 leaving narrow bars 34 of semi-conducting silicon material which are contiguous with rim 14.

Figure 4:
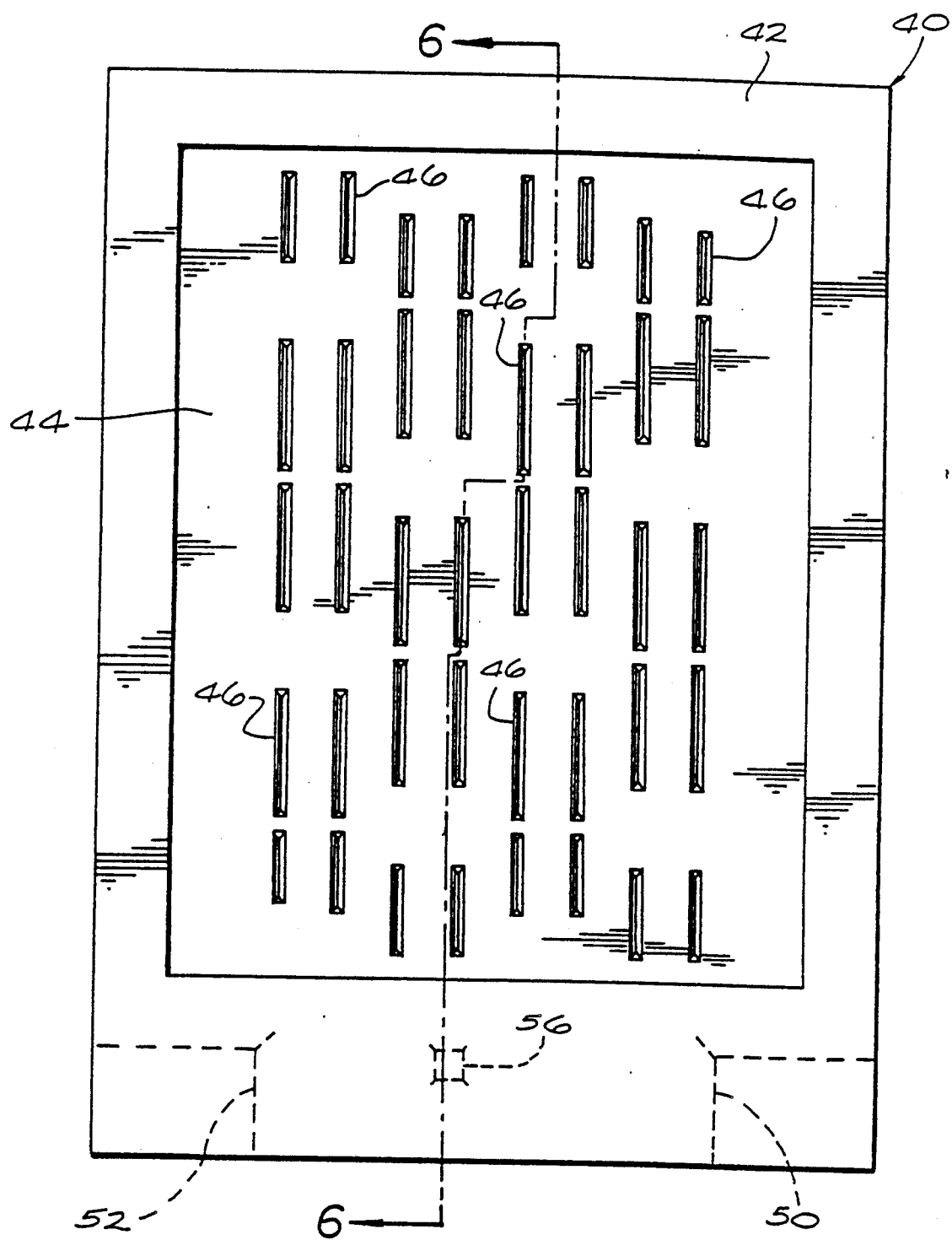
FIG. 4 is a plan view of the bottom surface of the upper fixed plate or lid.

FIG. 4 is a plan view of the bottom surface of the upper fixed plate or lid 40 of the transducer. This surface faces the surface of the movable plate 12 shown on FIG. 1. A rim 42 is formed of an inlaid Pyrex insulating layer extending a significant distance (such as 1.3 mil) toward the center of the plate so that rim 14 of plate 10 makes contact with rim 42 only and not with the center part 44 of lid 40 which is of silicon. The center portion 44 of plate 40 which is a capacitor plate facing central portion 12 of plate 10 includes a large member of grooves 46 which are discrete rectangular trenches for which dimensional control can be quite precise. The capacitor gaps are recessed about equally into both sides of the central plate 10, and air can flow from groove to groove in these gaps. The stop spots 48 and 68 formed on both sides of the movable mass 12 make contact with corresponding insulating layers on the surfaces 44 and 64 (FIG. 7) provided by a ½ micron layer of silicon dioxide.

Figure 5:
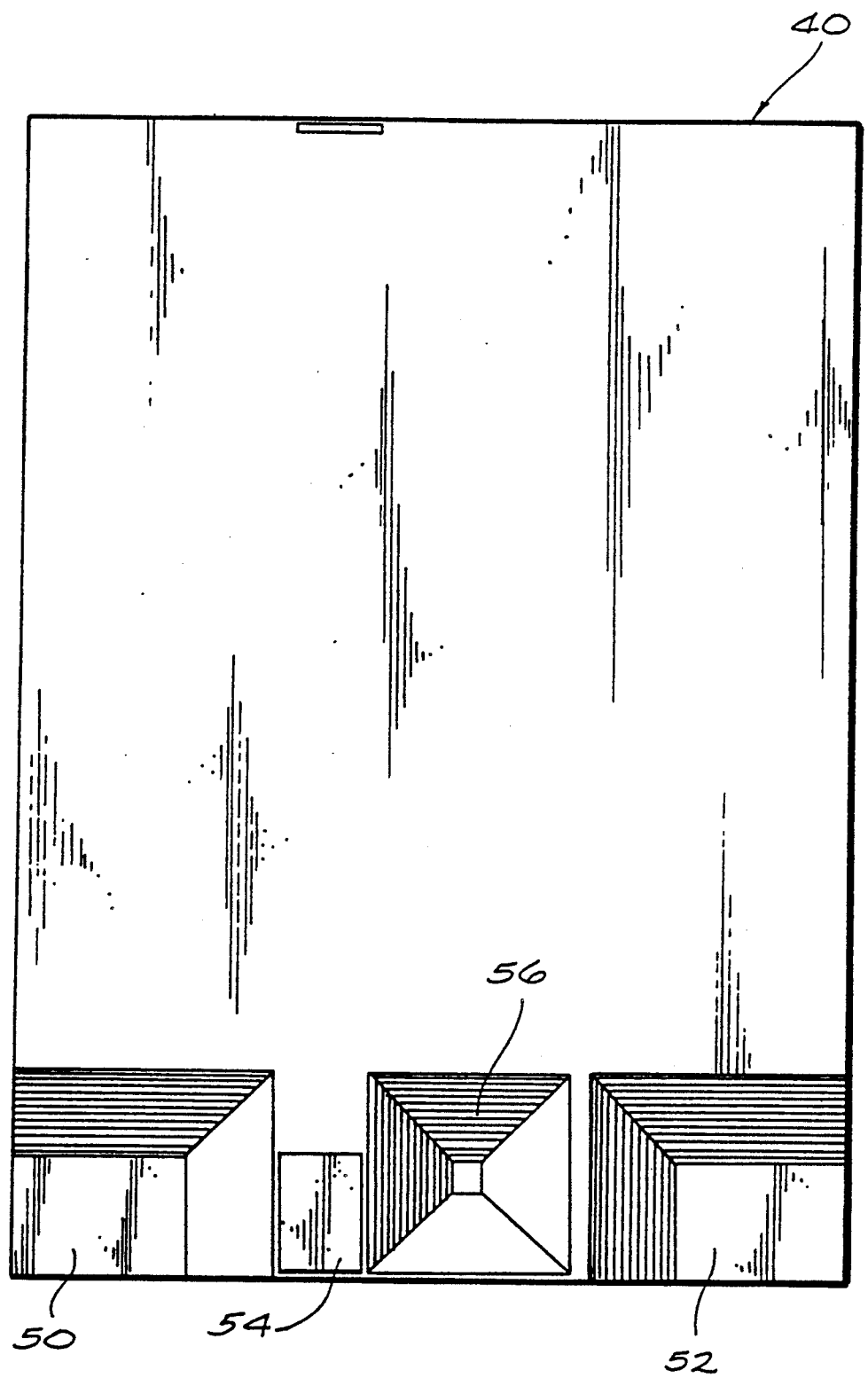
FIG. 5 is a plan view of the top surface of the lid.

FIG. 5 is a view of upper fixed plate 40 from the top or outside. This view shows that corner portions 50 and 52 are etched through the thickness of the silicon layer down to the Pyrex layer of rim 42. Adjacent opening 50 is an aluminum contact 54 which is the electrical connection to plate 40 which is one plate of the differential capacitor. A tapered hole 56, which also is etched through the silicon to the Pyrex layer provides a sight hole for viewing target 22 on the edge of movable plate 10 for purposes of alignment. The capacitors are formed as a large number of dice on a single wafer of much larger size and, after fabrication, are cut apart.

FIG. 6 is a sectional view taken along line 6—6 of FIG. 4. This view shows the tapered viewing hole 56 which extends through the silicon to the Pyrex layer of rim 42. Also shown are one of the grooves 46. The stop spots 48 take up a large part of the capacitor gap between the central mass 12 and center portion 44 of lid 40. Full scale travel of the movable central mass 12 is about 30 percent of the capacitor gap between plate 10 and the lid 40.

Figure 7:
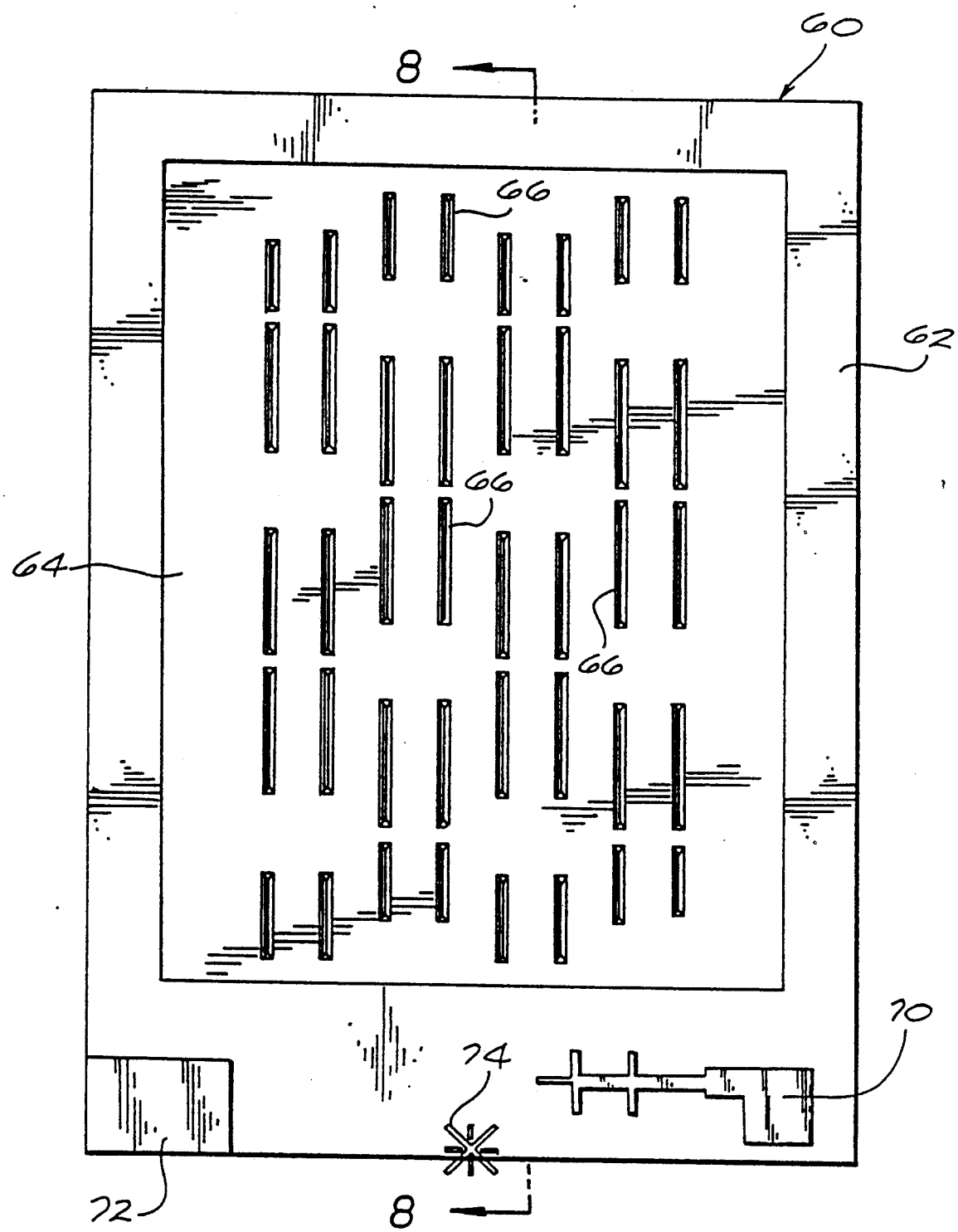
FIG. 7 is a plan view of the top side of the base or lower fixed plate.

The upper surface of the lower fixed plate or base 60 as shown on FIG. 7 faces the bottom side of movable plate 10 and, as with lid 40, includes a rim of inlaid Pyrex 62 and a central portion 64 which contains a large number of grooves 66 and which is oxide coated to prevent anodic bonding to the points of contact with stop spots 68 on movable mass 12. Grooves 66 aid in directing the flow of air through passages 16 from one side to the other of the central mass 12 in the same manner as do grooves 46. On one edge of the rim 62 is an electrode 70 of conducting material such as aluminum which is electrically isolated from base 60 and makes contact with the narrow bars 34 on extension 21 of member 10 (FIG. 2). When the plates are assembled the branches of contact 70 are pressed against bars 34 such that the electrical potential of core member 10 and specifically of movable capacitor plate 12 appears on contact 70 which is wired to an outside circuit. A second contact 72 is in electrical contact with the silicon material of base 60 and carries the electrical potential of base 60. FIG. 7 also shows a star shaped assembly target member 74 which actually extends somewhat beyond the ultimate dimensions of base 60, but which appears as shown prior to trimming. This target is seen through the tapered viewing hole 24 of FIGS. 1 and 2 when core member 10 is stacked on base 60.

FIG. 8 is a sectional view taken along line 8—8 of FIG. 7. This view shows the thickness of base 60 and the Pyrex inlay of rim 62 as well as grooves 66.

Figure 9A:
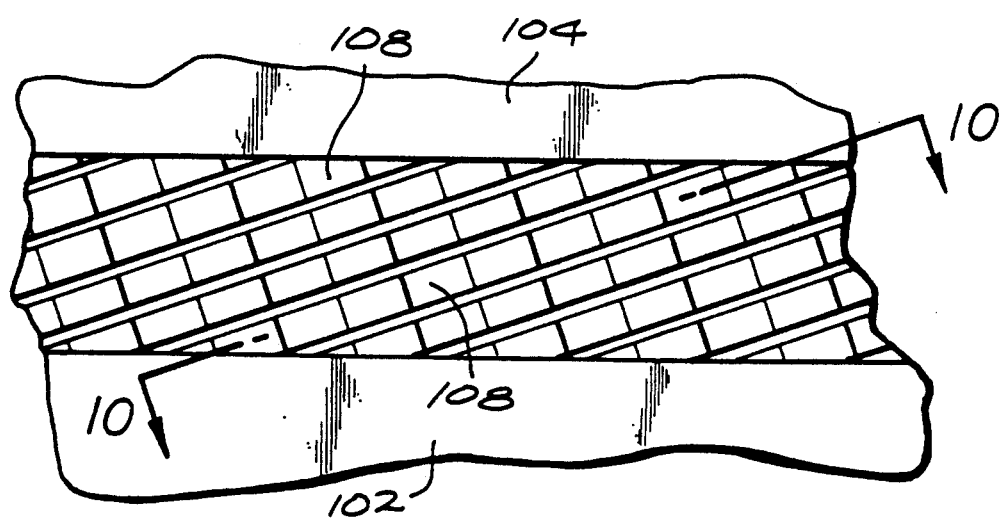
FIG. 9A is an enlarged portion of FIG. 9 identified A—A.
Figure 10:
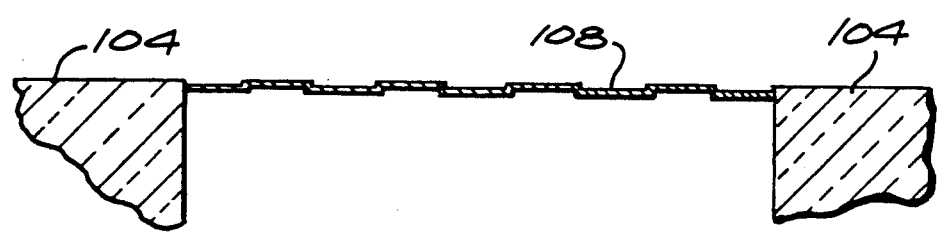
FIG. 10 is an enlarged cross sectional view of one of the suspension members of FIGS. 9 and 9A taken along line 10—10 of FIG. 9A.
Figure 9:
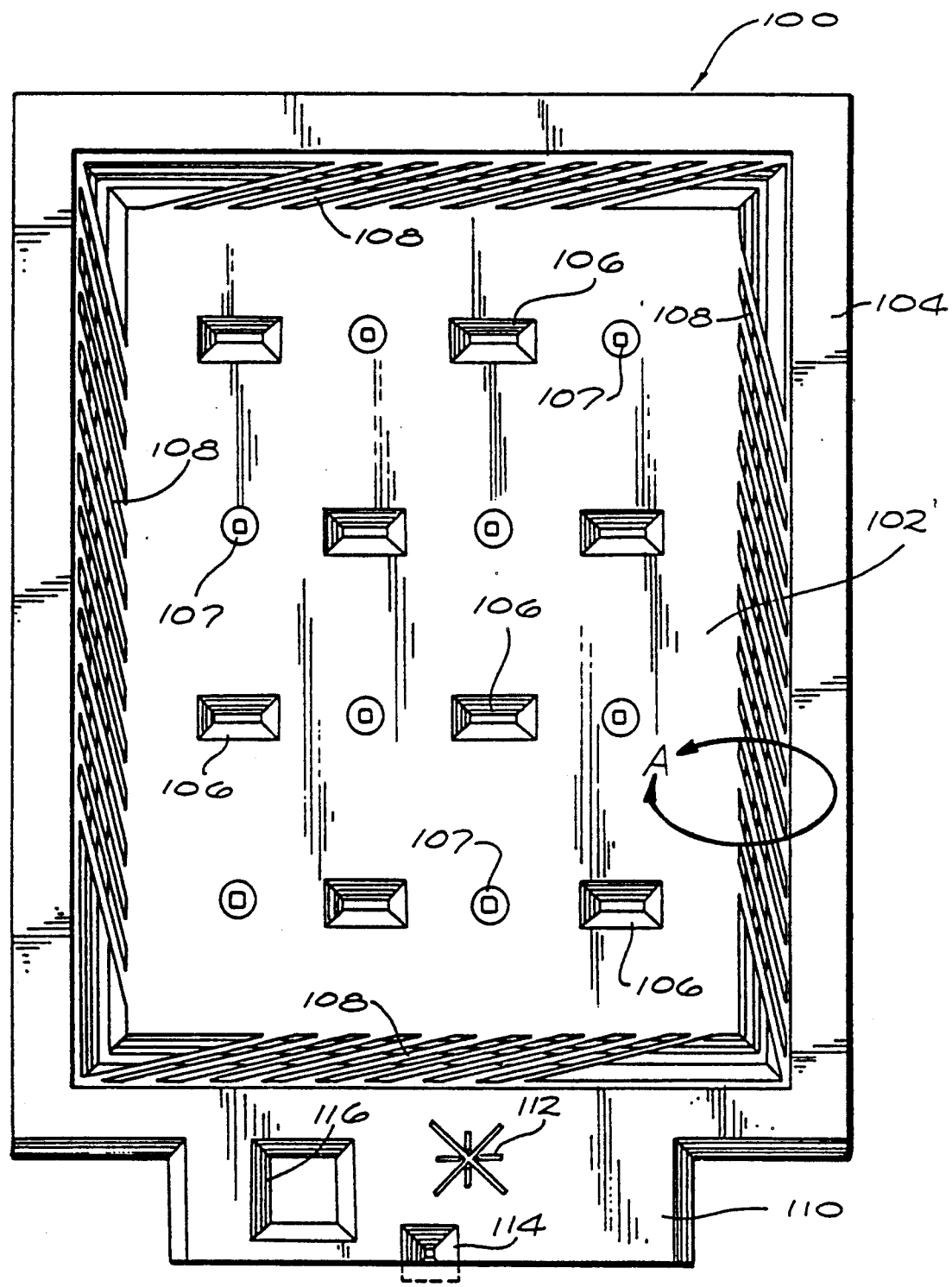
FIG. 9 is a plan view of one side of a movable capacitor plate used in alternate form of the invention.

The embodiment shown in FIGS. 9, 9A and 10 is very similar to that of FIGS. 1 and 2, but the movable capacitor plate 100 differs in that central mass 102 is suspended from rim 104 by means of a somewhat smaller number of narrow diagonal fingers or bars 108 which are of approximately uniform width rather than tapered and which include corrugations stepped between one plane and another by more than the thickness of the bars. This embodiment incorporates the through passages 106 for the passage of air and, as shown, would be assembled with a lid and base having grooves as shown in FIGS. 4 and 7, respectively. This embodiment includes other features as previously described including the stop spots 107, extension 110, the target 112, the tapered viewing hole 114 and the opening 116, which are directly analogous to components 21, 22, 24 and 26 of FIG. 1.

A detailed description of the processes for making the three separate layers of the transducer described above appears in U.S. Pat. No. 4,825,335. The steps set out in the patent teach the processes for making the layers described herein. One possible area wherein some additional explanation might be helpful is in connection with the process for forming the corrugated support fingers of FIGS. 9, 9A and 10. As set out in the patent, the starting material is a single crystal silicon wafer P type (100) plane indexed [110] within 0.7 degrees. The initial thickness is selected to be 0.0050 inches +0.0002 inches. Both sides are polished and then oxidized lightly to about 0.3 microns thickness. Photo resist material is applied to the front and back oxide coats and the wafer is then subjected to a buffered oxide etch which removes the oxide except where protected and a caustic etch which etches into the silicon approximately 1.2 microns. The protected oxide is then removed and the entire surface again reoxidized and an additional etching step applied wherein a positive photoresistive chemical is again applied and the oxide again etched away except for the protected pattern. This is followed by another etching step, etching into the silicon, again to 1.2 microns depth. Again the oxide is stripped away and the entire wafer reoxidized at 1070° C. one hour in a wet environment. In a further etching step both sides are protected by a photoresist material and the unprotected surface subjected to a buffered oxide etch through the oxide and a caustic leveling etch into the silicon layer to 1.93 microns such that the silicon surface is recessed to 4.33 microns +0.015 total. This last oxidation step is then repeated, a thick photoresist layer is applied to both sides and a pattern of stripes is applied crosswise to the ultimate support fingers. The stripes are etched through the oxide. The photoresist is then removed and the wafer etched in caustic to 3 microns depth. Another photomasking operation is then employed to remove protective oxide from the remainder of the support finger area and all of the capacitor plate area. Following this, both sides of the wafer are doped with boron to a concentration in excess of $5 \times 10^{19}$ atoms/cc to an etch resistant depth with a thickness of about 2.4 microns.

Following the doping process there is always an oxide layer which is removed and the wafer is then reoxidized at 1030 degrees C. for twenty minutes. Both sides are then recoated with a resist and etched again. The wafer is then reoxidized in a wet atmosphere at 990° for approximately ten minutes to provide a smaller layer of oxide. Both sides are then masked to produce the desired patterns and the wafer subjected to reaction in ionized low pressure gas which can preferentially etch through oxide or silicon, and, in that part of the wafer where the fingers are to be formed, the etch extends approximately three microns into the silicon on both sides. This removes both the oxide and part of the silicon. In two subsequent steps, a selective etchant is applied to both sides to etch entirely through the wafer except for those parts protected by the boron dopant material. This produces the fingers 108.

Figure 11:
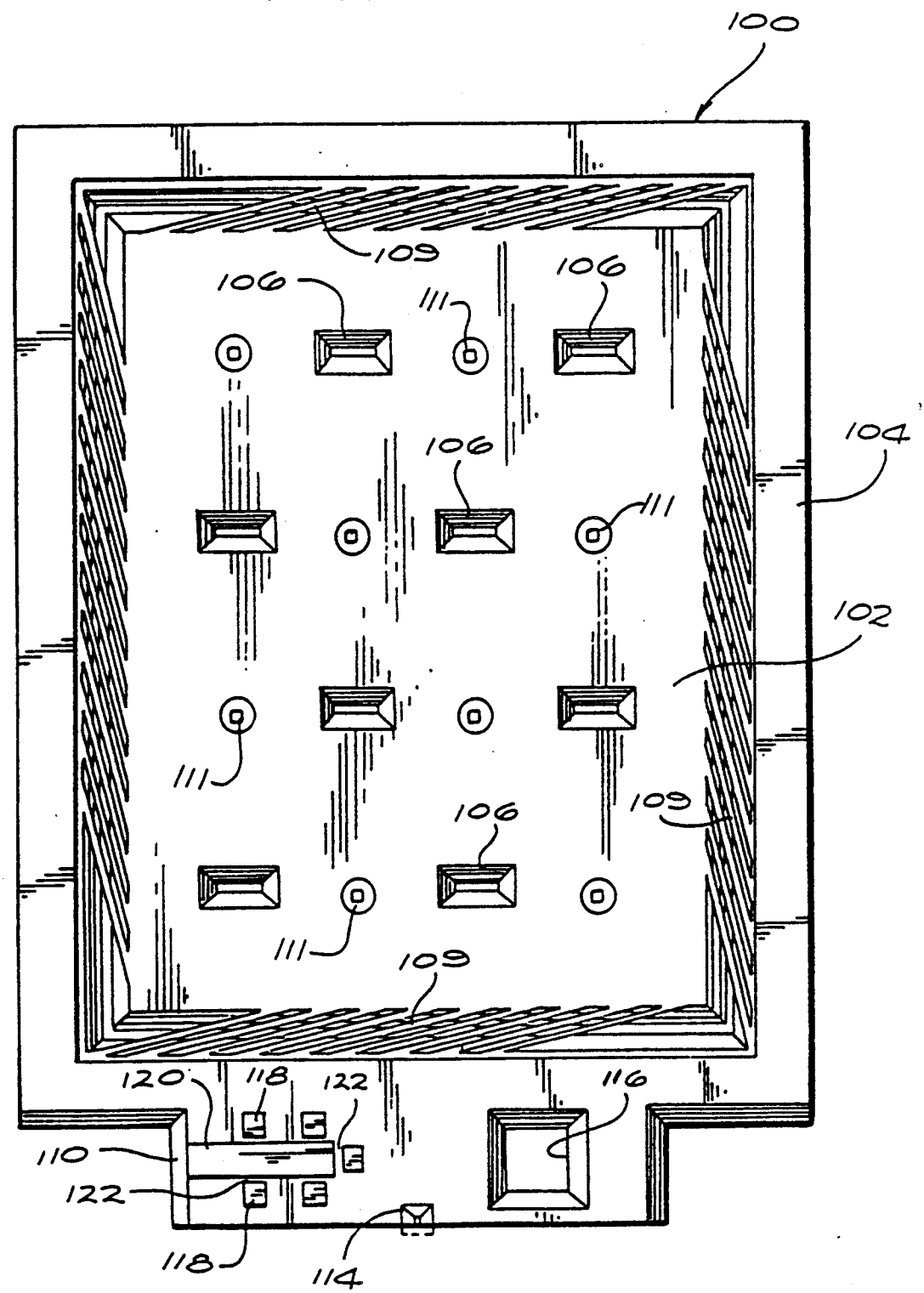
FIG. 11 is a plan view of the opposite side of the plate of FIG. 9.

FIG. 11 shows the bottom side of movable capacitor plate 100 which is identical to that if FIG. 2 except that it shows the corrugated bars 109 in place of the sinuous suspension members 20. Thus the central mass 102 including stop spots 111 is suspended from each edge by the fingers 108 and 109 in the same manner as central mass 12 is suspended by fingers 18 and 20. The rectangular depressions 118 and 120 provide narrow bars 122 in the surface of extension 110 which make contact with the contact member 70 (FIG. 7) as described above to provide the electrical output from plate 100.

From the foregoing it will be understood that applicant has provided a differential variable capacitance acceleration sensor having the advantages of those described in U.S. Pat. No. 4,825,335 referred to above, but which may be made capable of responding to substantially smaller acceleration forces. It is recognized that modifications may be made within the scope of the present invention. While only two shapes of suspending members have been described herein, those skilled in the art will be aware of others which will provide similar benefits, and I do not wish to be limited other than by the following claims as interpreted with the benefit of the doctrine of equivalents.

I claim:

1. In a differential variable capacitance transducer including a first layer of semiconductor material having a rim of insulating material and a surface thereof acting as one plate of a capacitor, a second layer of semiconductor material having a rim of insulating material and a surface thereof acting as a plate of a capacitor, an intermediate layer of semiconductor material positioned between said first and second plates including a rim adjacent said rims of said first and second layers, a seismic mass and means suspending said mass from said rim such that said mass moves toward and away from said capacitor plates when said accelerometer is exposed to acceleration forces, characterized in that said suspending means includes a plurality of suspension members extending from said intermediate layer rim to said seismic mass, said members being formed and shaped such that they deviate from straightness and are subjected to tension along their length.

2. A differential variable capacitance transducer as claimed in claim 1 wherein as said seismic mass is deflected from its at rest position, said suspension members are pulled toward straightness.

3. A differential variable capacitance transducer as claimed in claim 2 wherein said suspending means includes a first group of suspension members extending from an edge of said intermediate layer rim in a first plane to said mass and a second group of suspension members extending from an edge of said rim in a second plane to said mass.

4. A differential variable capacitance transducer as claimed in claim 1 wherein said suspension members are slender sinuous members.

5. A differential variable capacitance transducer as claimed in claim 1 wherein said suspension members are bars and include corrugations stepped between one plane and another plane by more than the thickness of said bars.

6. A differential variable capacitance transducer including a first layer of semiconducting material having a first rim of insulating material on a surface thereof, a second layer of semiconducting material having a rim of insulating material on a surface facing said first layer of insulating material, an intermediate layer of semiconductor material positioned between said first and second layers including a rim, a seismic mass having conductive surfaces on both sides facing said first and second layers of semiconducting material, means providing fluid communication between opposite sides of said mass and suspension members extending between said seismic mass and said rim for supporting said mass, said suspension members being shaped such that they deviate from straightness and are subjected to tension along their length and when said accelerometer is subjected to acceleration, said mass is deflected from its at rest position and said suspension members are pulled toward straightness.

7. A differential variable capacitance transducer as claimed in claim 6 wherein said suspension members include a first group of suspension members extending from an edge of said intermediate layer rim in a first plane to said mass and a second group of suspension members extending from an edge of said rim in a second plane to said mass.

8. A differential variable capacitance transducer as claimed in claim 7 wherein said suspension members are slender sinuous members.

9. A differential variable capacitance transducer as claimed in claim 7 wherein said suspension members are bars and include corrugations stepped between one plane and another plane by more than the thickness of said bars.

10. A differential variable capacitance transducer as claimed in claim 7 wherein electrical contact means are provided connecting said first and second plates and both sides of said intermediate plate for transmitting the output of said transducer.

11. A differential variable capacitance transducer as claimed in claim 6 wherein said suspension members are slender sinuous members.

12. A differential variable capacitance transducer as claimed in claim 6 wherein said suspension members are bars and include corrugations stepped between one plane and another plane by more than the thickness of said bars.

13. A differential variable capacitance transducer including a laminate of three layers, an inner plate layer, a first outer plate layer and a second outer layer of substantially the same size;
said layers comprising plates formed essentially of monocrystalline silicon;
said inner plate layer including a rim and a central seismic mass forming the moving capacitive plate of said transducer having a first and a second face, said mass being spaced from said rim;
a large number of suspension members which are atomically continuous with said mass extending from both top and bottom edges of said mass to top and bottom edges of said rim, said seismic mass being supported on said suspension members for movement in a plane normal to the plane of said plate;
said suspension members being formed and shaped such that they deviate from straightness and are subjected to tension along their length;
a plurality of holes formed in said seismic mass forming fluid communication between said first and second faces of said mass;
a plurality of grooves formed in said layers extending from near at least some of said holes to points spaced from said holes;
said outer layers and said rim forming a cavity for said seismic mass and a gas in said cavity, said outer layers each having a rim of borosilicate glass insulating said outer layers from the rim of said inner plate layer; and
cooperating electrical contact means on said plate and said outer layers for transmitting the output of said transducer.

14. A differential variable capacitance transducer as claimed in claim 13 wherein as said seismic mass is deflected from its at rest position, said suspension members are pulled toward straightness.

15. A differential variable capacitance transducer as claimed in claim 14 wherein said suspension members are slender sinuous members.

16. A differential variable capacitance transducer as claimed in claim 15 wherein said central mass includes a plurality of grooves communicating with said holes.

17. A differential variable capacitance transducer as claimed in claim 15 wherein the dimensions of said grooves and said holes are controlled to control the frequency response of said transducer.

18. A differential variable capacitance transducer as claimed in claim 14 wherein said suspension members are bars and include corrugations stepped between one plane and another plane by more than the thickness of said bars.

19. A differential variable capacitance transducer as claimed in claim 18 said central mass includes a plurality of grooves communicating with said holes.

20. A differential variable capacitance transducer as claimed in claim 14 wherein a plurality of dielectric stop members are formed on the opposite surfaces of said seismic mass, said stop members extending above said surfaces an amount which limits the travel of said seismic mass to significantly less than half of the capacitor gap between the seismic mass and said outer plate layers.

* * * * *